United States Patent
Reichel et al.

(10) Patent No.: US 9,882,744 B2
(45) Date of Patent: Jan. 30, 2018

(54) METHOD AND A DEVICE FOR DETERMINING AN ESTIMATED VALUE FOR A NOISE POWER

(71) Applicant: Rohde & Schwarz GmbH & Co. KG, Munich (DE)

(72) Inventors: Thomas Reichel, Lichtenau (DE); Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 248 days.

(21) Appl. No.: 14/813,431

(22) Filed: Jul. 30, 2015

(65) Prior Publication Data
US 2016/0037372 A1    Feb. 4, 2016

(30) Foreign Application Priority Data
Jul. 30, 2014    (DE) .................. 10 2014 214 923

(51) Int. Cl.
*H04L 25/02*    (2006.01)
*H04B 17/336*    (2015.01)

(52) U.S. Cl.
CPC ....... *H04L 25/0202* (2013.01); *H04B 17/336* (2015.01)

(58) Field of Classification Search
CPC .......................... H04L 25/0202; H04B 17/336
USPC ................................................. 370/241, 252
See application file for complete search history.

(56) References Cited

U.S. PATENT DOCUMENTS

| | | | |
|---|---|---|---|
| 2003/0219069 A1* | 11/2003 | Chen ................... | H04B 7/1851 375/227 |
| 2006/0014542 A1 | 1/2006 | Khandekar et al. | |
| 2008/0008258 A1 | 1/2008 | Tanabe | |
| 2008/0273630 A1* | 11/2008 | Mege ..................... | H04L 1/005 375/341 |

(Continued)

FOREIGN PATENT DOCUMENTS

| | | |
|---|---|---|
| DE | 10302362 | 2/2007 |
| DE | 10309262 | 8/2007 |
| DE | 102008052335 | 4/2010 |

(Continued)

OTHER PUBLICATIONS

Gopal, L. et al., "Performance analysis of signal-to-noise ratio estimators in AWGB and fading channels", 6th National Conference on Telecommunication Technologies and 2nd Malaysia Conference on Photonics Conference, 2008, pp. 300-304.

*Primary Examiner* — Obaidul Huq
(74) *Attorney, Agent, or Firm* — Lee & Hayes, PLLC

(57) ABSTRACT

A device for determining an estimated value for a mean power of the noise-signal sequence, which is superposed on an undisturbed periodic transmitted-signal sequence, determines a mean power of a received-signal sequence, which corresponds to the undisturbed periodic transmitted-signal sequence with the addition of the superposed noise-signal sequence. It then estimates an estimated-signal sequence for the undisturbed periodic transmitted-signal sequence from the received-signal sequence. Following this, a mean power of the estimated-signal sequence and the estimated value of the mean power of the noise-signal sequence is determined from a difference between the determined mean power of the received-signal sequence and the determined mean power of the estimated-signal sequence.

11 Claims, 3 Drawing Sheets

(56) References Cited

U.S. PATENT DOCUMENTS

2009/0274222 A1 11/2009 Morelli et al.
2012/0182857 A1 7/2012 Bertrand et al.

FOREIGN PATENT DOCUMENTS

EP 2120330 11/2009
WO WO2008148075 12/2008

* cited by examiner

US 9,882,744 B2

METHOD AND A DEVICE FOR DETERMINING AN ESTIMATED VALUE FOR A NOISE POWER

PRIORITY

This application claims priority of German patent application DE 10 2014 214 923.1 filed on Jul. 30, 2014, which is incorporated by reference herewith.

FIELD OF THE INVENTION

The invention relates to a method and a device for the automatic determination of an estimated value for a noise power.

BACKGROUND OF THE INVENTION

In a conventional power-measuring device, such as that described in DE 10 2008 052 335 A1, the total power of a received signal with superposed noise comprising a noise power and a payload-signal power is measured. Disadvantageously, it is not possible to determine the payload-signal power separately from the noise power in this context. A determination of the signal-noise ratio derived from this is therefore also not possible.

One object of the invention among others is therefore to provide a method, a computer program and a device for determining the payload-signal power and the noise power from a received signal with superposed noise.

SUMMARY OF THE INVENTION

According to one aspect of the invention, an estimated value for the mean power of a noise-signal sequence which is superposed on an undisturbed periodic transmitted-signal sequence is obtained according to the invention from the difference between the determined mean power of an estimated-signal sequence for the undisturbed transmitted-signal sequence and the determined mean power of the received-signal sequence, wherein the estimated-signal sequence is estimated from the received-signal sequence.

The estimation of the estimated-signal sequence for the undisturbed periodic transmitted-signal sequence is preferably obtained with the use of the maximum-likelihood estimation method from summated sampled values of the received-signal sequence, wherein each summated value of the received-signal sequence is obtained from a sum of sampled values of the received-signal sequence in several periods associated in each case with a polyphase of the period of the undisturbed periodic transmitted-signal sequence.

In order to compensate the estimation error—that is, the difference between the estimated-signal sequence estimated for the undisturbed periodic transmitted-signal sequence and the actual undisturbed periodic transmitted-signal sequence—the difference between the determined mean power of the estimated-signal sequence and the determined mean power of the received-signal sequence is preferably weighted with the weighting factor.

This weighting factor preferably corresponds to the quotient of the number of periods of the undisturbed periodic transmitted-signal sequence used in estimating the estimated-signal sequence and the number of periods of the undisturbed periodic transmitted-signal sequence decremented by the value one or is proportional to this quotient.

A simplification of the estimation method is obtained if only two periods of the undisturbed periodic transmitted-signal sequence are used in the estimation of the estimated-signal sequence. In this case, the mean power of the noise-signal sequence is obtained from the mean value of all magnitude-squared differences in each case between a sampled value of the received-signal sequence in the one period and respectively a sampled value of the received-signal sequence in the other period.

If, instead of a real transmitted-signal sequence or respectively received-signal sequence, a complex transmitted-signal sequence or respectively received-signal sequence is used, such as is typically used in the equivalent baseband, the mean power of the estimated-signal sequence is advantageously determined only in one single period, preferably in the first period, of the undisturbed periodic transmitted-signal sequence.

In this context, the estimated-signal sequence may be obtained from summated sampled values of the received-signal sequence. Each summated sampled value of the received-signal sequence is obtained respectively, in turn from a sum of sampled values of the received-signal sequence in the individual periods of the undisturbed periodic transmitted-signal sequence observed in the estimation, associated in each case with a polyphase of the period of the undisturbed periodic transmitted-signal sequence. Additionally, in this context, each sampled value of the received-signal sequence considered in the individual periods may be weighted with a phase offset between the undisturbed periodic transmitted-signal sequence of the respective period and the undisturbed periodic transmitted-signal sequence of the first period.

In this context, the phase offset may be proportional to the frequency offset between the complex undisturbed periodic transmitted-signal sequence or respectively received-signal sequence in the respective period and the associated complex undisturbed periodic transmitted-signal sequence or respectively received-signal sequence in the first period.

The phase offset between the undisturbed periodic transmitted-signal sequence of the respective period and the undisturbed periodic transmitted-signal sequence of the first period can be determined from a phase of a sum of sampled values of the complex received-signal sequence in the respective period which is multiplied in each case by a sampled value of the same polyphase of the conjugated complex received-signal sequence in the first period.

Other aspects of the invention concern a respective device and respective data carrier for a computer program.

BRIEF DESCRIPTION OF THE DRAWINGS

Exemplary embodiments of the device according to the invention and of the method according to the invention for determining an estimated value for a mean power of a noise-signal sequence which is superposed on an undisturbed periodic transmitted-signal sequence, are explained in detail in the following with reference to the drawings, by way of example only. The Figures of the drawings show.

DETAILED DESCRIPTION OF PREFERRED EMBODIMENTS

Figure 1:
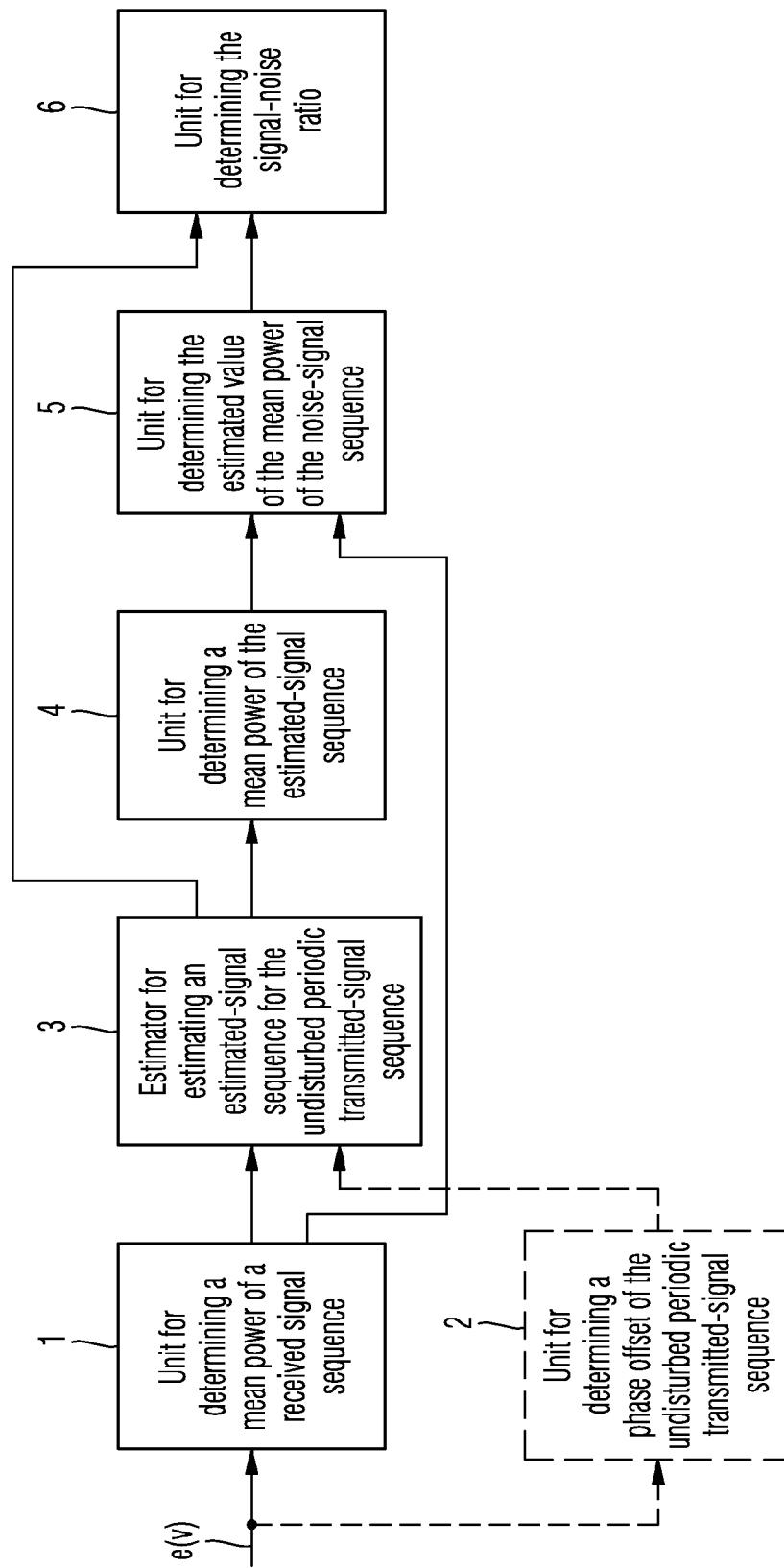
FIG. 1 a block-circuit diagram of an exemplary embodiment of the device according to the invention for determining an estimated value for a mean power of a noise-signal sequence, which is superposed on an undisturbed periodic transmitted-signal sequence.
Figure 2:
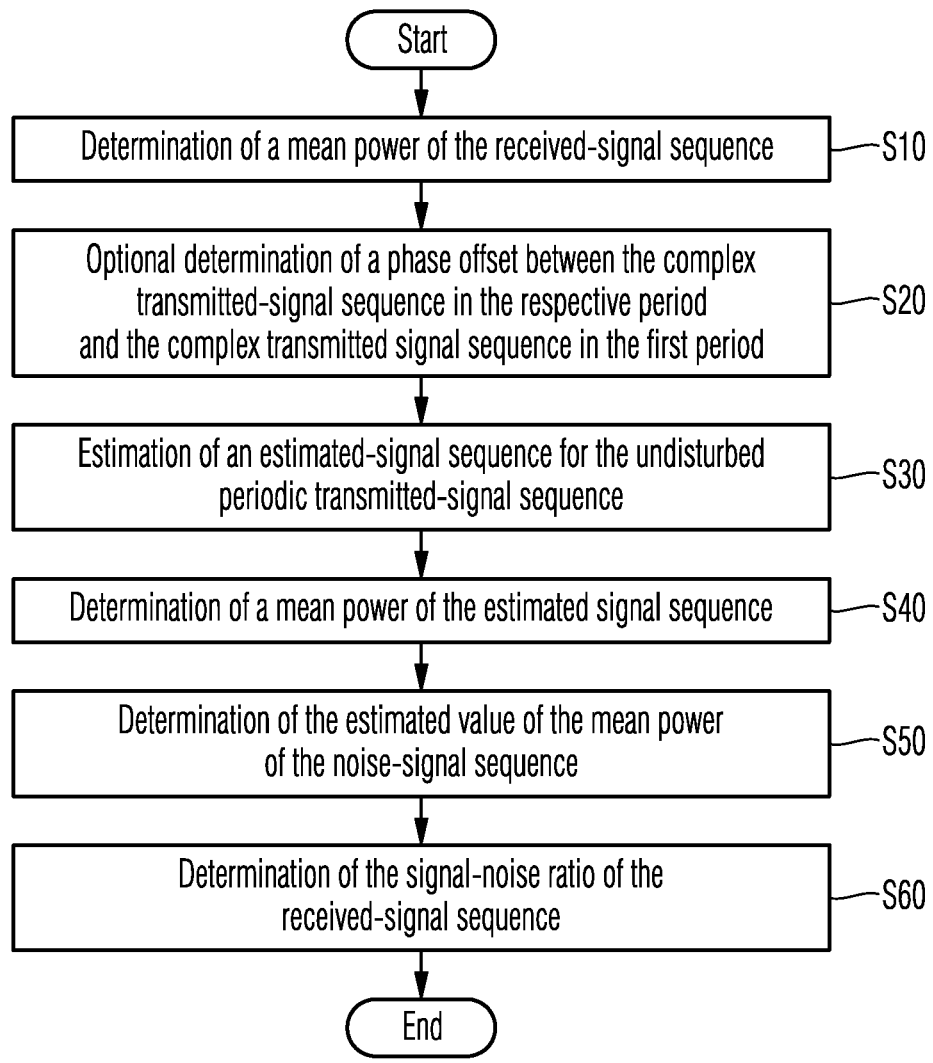
FIG. 2 a flow chart of an exemplary embodiment of the method according to the invention for determining an estimated value for a mean power of a noise-signal sequence which is superposed on an undisturbed periodic transmitted-signal sequence.

Before exemplary embodiments of the device according to the invention and the method according to the invention for determining an estimated value for a mean power of a noise-signal sequence which is superposed on an undisturbed periodic transmitted-signal sequence are explained in detail with reference to the block-circuit diagram of FIG. 1 and the flow chart of FIG. 2, the substantial mathematical background for understanding the invention will be derived in the following.

The maximum-likelihood estimation method is used in order to estimate the estimated-signal sequence for the undisturbed periodic transmitted-signal sequence.

The maximum-likelihood function $L(m, s)$ for a total of n sampled values $x_1, \ldots, x_n$ of a signal sequence x, which conform to a Gaussian-distributed probability density $f(x|\mu, \sigma^2)$ with the mean value $\mu$ and the variance $\sigma^2$ according to equation (1), is obtained according to equation (2):

$$f(x|\mu, \sigma^2) = \frac{1}{\sqrt{2\pi\sigma^2}} \cdot \exp\left(-\frac{(x-\mu)^2}{2\sigma^2}\right) \quad (1)$$

$$L(m, s) = f(x_1, \ldots, x_n) = \prod_{i=1}^{n} f(x_i | s^2) = \left(\frac{1}{2\pi s^2}\right)^{n/2} \cdot \exp\left(-\frac{\sum_{i=1}^{n}(x_i - m)^2}{2s^2}\right) \quad (2)$$

The parameter m in the maximum-likelihood function $L(m, s)$ is obtained according to equation (3), while the parameter $s^2$ in the maximum-likelihood function $L(m, s)$ can be determined according to equation (4).

$$m = \bar{x} = \sum_{i=1}^{n} x_i \quad (3)$$

$$s^2 = \frac{1}{n} \cdot \sum_{i=1}^{n}(x_i - m)^2 \quad (4)$$

The expected value $E[m]$ of the parameter m is obtained according to equation (5), so that the maximum-likelihood estimator m for $\mu$ is true to expectation.

$$E[m] = \mu \quad (5)$$

The expected value $E[s^2]$ of the parameter $s^2$ is obtained according to equation (6), so that the maximum-likelihood estimate $s^2$ for $\sigma^2$ is not true to expectation.

$$E[s^2] = \frac{n-1}{n} \cdot \sigma^2 \quad (6)$$

Figure 3:
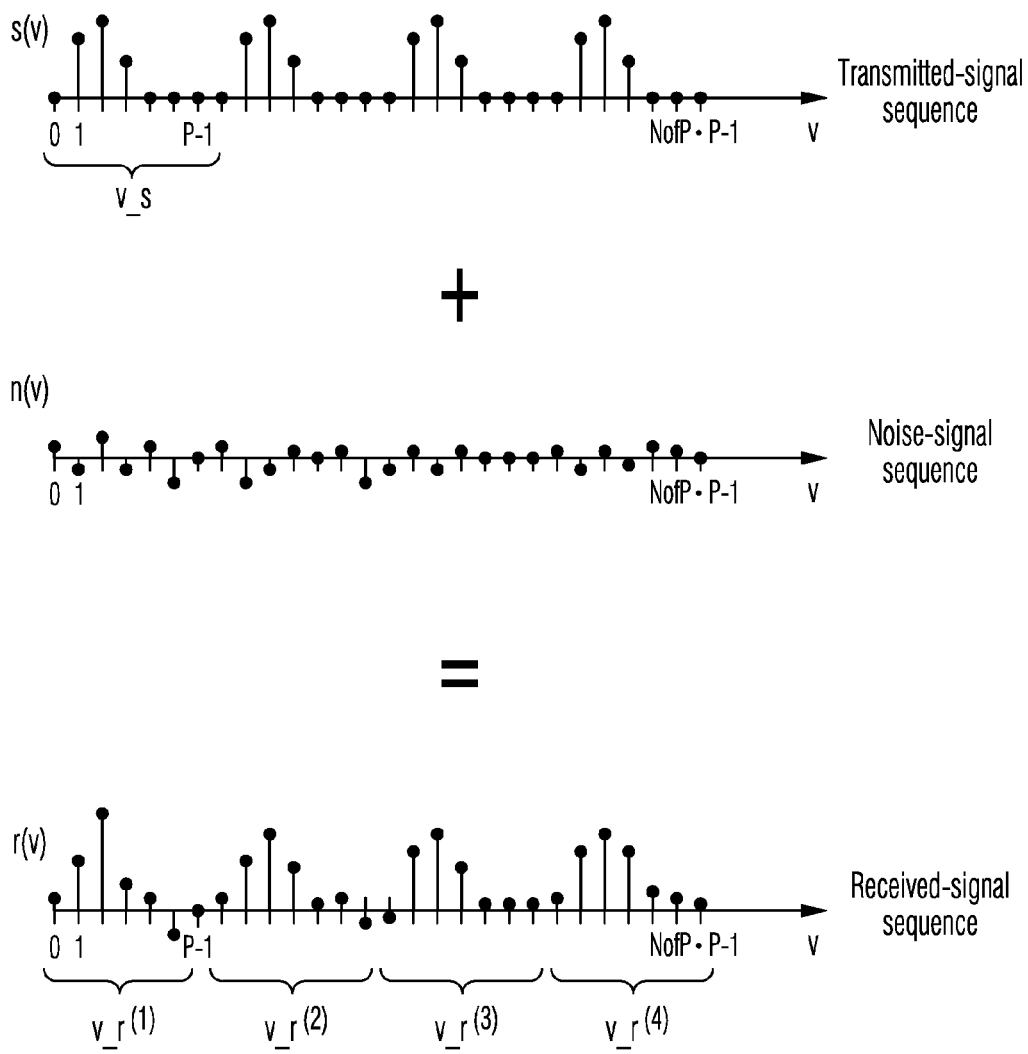
FIG. 3 a time-flow chart of the transmitted-signal sequence, the noise-signal sequence and the received-signal sequence.

For a reception-signal sequence $e(v)$ with $v=1, 2, \ldots$ with a Gaussian-distributed probability density $f(x|\mu, \sigma^2)$, the terms $x_i - m$ in the maximum-likelihood function $L(m, s)$ according to equation (2) consequently correspond to the noise-signal sequence $n(v)$ with $v=1, 2, \ldots$ . In this case, equation (2) is transformed into equation (7). Since the determination-equation (4) for the parameter $s^2$ corresponds to the definition of the mean noise power N, the parameter $s^2$ can be substituted with the mean noise power N. The number NofP·P of sampled values of the noise-signal sequence $n(v)$ considered in this context is obtained according to FIG. 3 from the product of the number NofP of periods to be considered and the number P of sampled values of the noise-signal sequence $n(v)$ within one period.

$$L = \left(\frac{1}{2\pi N}\right)^{(NofP\cdot P)/2} \cdot \exp\left(-\frac{\sum_{i=0}^{NofP\cdot P - 1} n(v)^2}{2N}\right) \quad (7)$$

Since the exponential function in the maximum-likelihood function L according to equation (7) rises monotonously, the estimated value N for the noise power N cannot be determined via a maximum-value determination of the maximum-likelihood function L. In an equivalent manner, the estimated value N for the mean noise power N—with reference to equation (4)—can be determined according to equation (8).

$$N = \frac{1}{NofP \cdot P} \cdot \sum_{i=0}^{NofP \cdot P} n^2(v) \quad (8)$$

A sampled value $n(v)$ of the noise-signal sequence $n(v)$ with $v=1, 2, \ldots$ is obtained from the difference between a sampled value $v\_r^{(i)}(p)$ in the polyphase p within the period i of the vector with sampled values of the received-signal sequence and the sampled value $v\_s(p)$ in the polyphase p of the vector with sampled values of the undisturbed periodic transmitted-signal sequence. Equation (8) is accordingly transformed into equation (9).

$$N = \frac{1}{NofP \cdot P} \cdot \sum_{i=0}^{NofP \cdot P} |v\_r^{(i)}(p) - v\_s(p)|^2 \quad (9)$$

The vector $v\_s$ with sampled values of the undisturbed periodic transmitted-signal sequence is unknown and must therefore be estimated. In order to estimate the vector $v\_s$, the gradient according to the vector $v\_s$ is formed from the cost function according to equation (8) and set to 0. The estimated value $v\_\hat{s}$ for the vector $v\_s$ with sampled values of the undisturbed periodic transmitted-signal sequence is obtained according to equation (10).

$$v\_\hat{s} = \frac{1}{NofP} \cdot \sum_{i=1}^{NofP} v\_r^{(i)} \quad (10)$$

Just as the expected value $E[s^2]$ of the parameter $s^2$, which is obtained from a total of n sampled values $x_i$ according to equation (4), must be weighted according to equation (6) with a correction factor $$\frac{n}{n-1}$$

in order to determine the exact variance $\sigma^2$—the so-called corrected sample variance—in an equivalent manner, the estimated value N for the mean noise power N according to equation (9), which contains the estimated value $v\_\hat{s}$ for the vector $v\_s$ obtained according to equation (10) from a total of NofP received-signal vectors $v\_r^{(i)}$, must be corrected by the correction factor $$\frac{NofP}{NofP-1}$$

according to equation (11).

$$N = \frac{NofP}{NofP-1} \cdot \frac{1}{NofP \cdot P} \cdot \sum_{p=0}^{P-1} \sum_{i=0}^{NofP} |v\_r^{(i)}(p) - v\_\hat{s}(p)|^2 \quad (11)$$

Equation (11) can be transformed by introducing the mean power $P_r$ of the received-signal sequence according to equation (13), the estimated signal $v\_\hat{s}$ of the undisturbed periodic transmitted-signal sequence according to equation (14) and the mean power $P_{s+}$ of the estimated-signal sequence for the undisturbed periodic transmitted signal sequence according to equation (15), as follows, according to equation (12). The mean power $P_{s+}$ of the estimated-signal sequence for the undisturbed periodic transmitted-signal sequence provides a certain residual noise because of the averaging over a finite number NofP·P of sampled values of the received-signal sequence and is therefore not true to expectation relative to the mean power $P_s$ of the transmitted-signal sequence:

$$N = \frac{NofP}{NofP-1} \cdot \left[ \underbrace{\frac{1}{NofP \cdot P} \sum_{v=0}^{NofP \cdot P-1} |v\_r(v)|^2}_{P_r} - \underbrace{\frac{1}{P} \sum_{p=0}^{P-1} \left| \underbrace{\frac{1}{NofP} \sum_{i=1}^{NofP} v\_r^{(i)}(p)}_{v\_\hat{s}} \right|^2}_{P_{s+}} \right] = \quad (12)$$

$$= \frac{NofP}{NofP-1} \cdot [P_r - P_{s+}]$$

$$P_r = \frac{1}{NofP \cdot P} \sum_{v=0}^{NofP \cdot P} |v\_r(v)|^2 \quad (13)$$

$$v\_\hat{s} = \frac{1}{NofP} \cdot \sum_{i=1}^{NofP} v\_r^{(i)}(p) \quad (14)$$

$$P_{s+} = \frac{1}{P} \sum_{p=0}^{P-1} \left| \frac{1}{NofP} \cdot \sum_{i=1}^{NofP} v\_r^{(i)}(p) \right|^2 \quad (15)$$

The mean power $P_s$ of the undisturbed periodic transmitted-signal sequence is obtained according to equation (16) from the difference of the mean power $P_r$ of the received-signal sequence and the estimated value N for the mean noise power N.

$$P_s = P_r - N \quad (16)$$

The estimated value SNR for the signal-noise ratio SNR is obtained according to equation (17) from the quotient between the mean power $P_s$ of the undisturbed periodic transmitted-signal sequence and the estimated value N for the mean noise power N.

$$SNR = \frac{P_s}{N} \quad (17)$$

For the special case that only the sampled values of the received-signal sequence in NofP=2 periods of the undisturbed periodic transmitted-signal sequence are considered in the determination of the estimated value N for the mean noise power N, starting from equation (11) in combination with equation (14), the relationship in equation (18) is obtained for the estimated value N of the mean noise power N.

$$N = \frac{NofP}{NofP-1} \cdot \frac{1}{NofP \cdot P} \cdot \sum_{p=0}^{P-1} \sum_{i=0}^{NofP} |v\_r^{(i)}(p) - v\_\hat{s}(p)|^2 = \quad (18)$$

$$= \text{Mean}\{|v\_r^{(1)} - v\_\hat{s}|^2 + |v\_r^{(2)} - v\_\hat{s}|^2\} =$$

$$= \text{Mean}\left\{ \begin{array}{l} |v\_r^{(1)} - 0.5 \cdot (v\_r^{(1)} + v\_r^{(2)})|^2 + \\ |v\_r^{(2)} - 0.5 \cdot (v\_r^{(1)} + v\_r^{(2)})|^2 \end{array} \right\} =$$

$$= 0.5 \cdot \text{Mean}\{|v\_r^{(1)} - v\_r^{(2)}|^2\}$$

In this context, the function Mean{v_x} represents the mean value of the vector $v\_x$ over all its vector elements $v\_x(p)$ in the individual polyphases p.

If the transmitted-signal sequence or respectively received-signal sequence does not provide any real sampled values, but instead, complex sampled values, and if no frequency-synchronised transmitted-signal sequence and therefore also no frequency-synchronised received-signal sequence is present, the following modifications in the determination of the estimated value N for the mean noise power N must be implemented:

Because of the frequency displacement $\Delta\omega$ occurring in this context, a missing frequency synchronisation leads to a phase offset $\varphi_i$ between the complex transmitted-signal sequence in the period i and the complex transmitted-signal sequence in a reference period 1 according to equation (19):

$$v\_s^{(i)} = v\_s^{(1)} \cdot \exp(j\Delta\omega(i-1)P \cdot T_a) = v\_s^{(1)} \cdot \exp(j\varphi_i) \quad (19)$$

The value $T_a$ in equation (19) reflects the sampled period of the transmitted-signal sequence.

The estimated value $\hat{\varphi}_i$ for the phase offset $\varphi_i$ is obtained starting from equation (19) by means of maximum-likelihood estimation according to equation (20).

$$\hat{\varphi}_i = \arg\left\{ \sum_{v=1}^{P} v\_r^{(i)}(p) \cdot (v\_r^{(1)}(p))^* \right\} \quad (20)$$

With the estimated value $\hat{\varphi}_i$ for the phase offset $\varphi_i$ determined according to equation (20) from the vector of the complex received-signal sequence in the period i or respectively in the period 1, the relationship in equation (21) is obtained for the estimated signal $v\_\hat{s}$ of the complex undisturbed periodic transmitted-signal sequence, starting from equation (14) taking into consideration equation (19).

$$v\_\hat{s}^{(1)} = \frac{1}{NofP} \cdot \sum_{i=1}^{NofP} v\_r^{(i)} \cdot \exp(-j\hat{\varphi}_i) \qquad (21)$$

With the estimated signal v_ŝ of the complex undisturbed periodic transmitted-signal sequence determined according to equation (21), the mean power $P_{s+}$ of the estimated signal for the complex undisturbed periodic transmitted-signal sequence can be determined according to equation (15). The remaining calculation steps are implemented in an equivalent manner to the case of a real transmitted-signal sequence or respectively received-signal sequence.

In the following, an exemplary embodiment of the device according to the invention for determining an estimated value for a mean power of a noise-signal sequence which is superposed on an undisturbed periodic transmitted-signal sequence is explained in detail with reference to the block-circuit diagram in FIG. 1 and an exemplary embodiment of the method according to the invention for determining an estimated value for a mean power of a noise-signal sequence which is superposed on an undisturbed periodic transmitted-signal sequence is explained in detail with reference to the flowchart in FIG. 2.

In the first method step S10 of the method according to the invention, the mean power $\hat{P}_r$ of the received-signal sequence is determined according to equation (13) in a unit 1 for determining a mean power of a received-signal sequence on the basis of a registered real or complex received-signal sequence e(v) with v=1, 2, . . . , NofP·P in a total of NofP periods and respectively P sampled values per period.

In the next method step S20, which is optionally implemented only in the presence of a complex signal sequence, the estimated value $\hat{\varphi}_i$ for the phase offset $\varphi_i$ of the undisturbed periodic transmitted signal sequence is determined in a unit 2 for determining a phase offset of the undisturbed periodic transmitted-signal sequence on the basis of the received-signal sequence in the period i and in the period 1 according to equation (20).

The next method step S30 contains the estimation of the estimated-signal sequence v_ŝ for the undisturbed periodic transmitted-signal sequence in an estimator 3 in order to estimate an estimated-signal sequence for the undisturbed periodic transmitted-signal sequence on the basis of equation (14) in the case of a real signal sequence and on the basis of equation (21) in the case of a complex signal sequence.

In the next method step S40, in a unit for determining a mean power of the estimated-signal sequence, the mean power $P_{s+}$ of the estimated-signal sequence is determined with reference to equation (15) on the basis of the estimated-signal sequence v_ŝ estimated in the preceding method step S30 for the undisturbed periodic transmitted-signal sequence.

In the next method step S50, in a unit 5 for determining the estimated value of the mean power of the noise-signal sequence, the estimated value N for the mean power N of the noise-signal sequence is determined with reference to equation (12) from the difference between the mean power $P_r$ of the received-signal sequence determined in method step S10 and the mean power $P_{s+}$ of the estimated-signal sequence determined in method step S40.

In the final method step S60, in a unit 6 for determining the signal-noise ratio, the mean power $P_s$ of the undisturbed periodic transmitted-signal sequence is determined with reference to equation (16) from the difference between the mean power $P_r$ of the received-signal sequence determined in method step S10 and the estimated value N for the mean power N of the noise-signal sequence determined in method step S50.

In the same method step S60, the estimated value SNR for the signal-noise ratio SNR is determined in the unit 6 for determining the signal-noise ratio according to equation (17) from the quotient between the previously determined mean power $P_s$ of the undisturbed periodic transmission-signal sequence and the estimated value N for the mean noise power N determined in method step S50.

The invention is not restricted to the embodiments of the method according to the invention and the device according to the invention presented. In particular, all combinations of the features claimed respectively in the individual claims, of the features disclosed in each case in the description and the features presented in the Figs. of the drawings are covered by the invention. All features of the method claims can also be features of the device claims and vice versa.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for the automatic determination of an estimated value for a mean power of a noise-signal sequence which is superposed on an undisturbed periodic transmitted-signal sequence by means of a computer device with the following method steps:
    determination of a mean power of a received-signal sequence which corresponds to the undisturbed periodic transmitted-signal sequence with the addition of the superposed noise-signal sequence;
    estimation of an estimated-signal sequence for the undisturbed periodic transmitted-signal sequence from the received-signal sequence, wherein:
    the estimated-signal sequence for the undisturbed periodic transmitted-signal sequence is formed from summated sampled values of the received-signal sequence, and
    each summated sampled value of the received-signal sequence is obtained in each case from a sum of sampled values of the received-signal sequence in several periods associated respectively with a polyphase of the period of the undisturbed periodic transmitted-signal sequence;
    determination of a mean power of the estimated-signal sequence for the undisturbed periodic transmitted-signal sequence; and determination of the estimated value of the mean power of the noise-signal sequence from a difference between the determined mean power of the received-signal sequence and the determined mean power of the estimated-signal sequence.

2. The method according to claim 1,
wherein the difference is weighted with a weighting factor in order to compensate an error between the estimated-signal sequence for the undisturbed periodic transmitted-signal sequence and the undisturbed periodic transmitted-signal sequence.

3. The method according to claim 2,
wherein the weighting factor is proportional or identical to the quotient between the number of periods and the number of periods decremented by the value one.

4. The method according to claim 1,
wherein in the case of a consideration of only two periods of the undisturbed periodic transmitted-signal sequence, the estimated value of the mean power of the noise-signal sequence is determined from the mean value of all magnitude-squared differences respectively between a sampled value of the received-signal sequence in a first period and respectively a sampled value of the received-signal sequence in the other, second period.

5. The method according to claim 1,
wherein in the case of a complex undisturbed periodic transmitted-signal sequence or respectively a complex received-signal sequence, the mean power of the estimated-signal sequence for the undisturbed periodic transmitted-signal sequence is determined only in a first period.

6. The method according to claim 5,
wherein the estimated-signal sequence for the undisturbed periodic transmitted-signal sequence in the first period is obtained from summated sampled values of the received-signal sequence,
wherein each summated sampled value of the received-signal sequence is obtained respectively from a sum of sampled values of the received-signal sequence in the individual periods associated in each case with a polyphase of the period of the undisturbed periodic transmitted-signal sequence, and
wherein each sampled value of the received-signal sequence in the individual periods is weighted with an estimated value for a phase offset of the undisturbed periodic transmitted-signal sequence between the respective period and the first period.

7. The method according to claim 6,
wherein the estimated value for the phase offset of the undisturbed periodic transmitted-signal sequence between the respective period and the first period is proportional to the frequency offset of the complex undisturbed periodic transmitted-signal sequence between the respective period and the first period.

8. The method according to claim 6,
wherein the estimated value for the phase offset of the undisturbed periodic transmitted-signal sequence between the respective period and the first period is determined from a phase of a sum of the sampled values of the complex received-signal sequence in the respective period, which is multiplied by a sampled value of the same polyphase of the conjugated complex received-signal sequence in the first period.

9. A device for determining an estimated value for a mean power of a noise signal sequence, which is superposed on an undisturbed periodic transmitted-signal sequence, with
a unit for determining a mean power of a received-signal sequence;
a downstream estimator for estimating an estimated-signal sequence for the undisturbed periodic transmitted-signal sequence, wherein:
the estimated-signal sequence for the undisturbed periodic transmitted-signal sequence is formed from summated sampled values of the received-signal sequence, and
each summated sampled value of the received-signal sequence is obtained in each case from a sum of sampled values of the received-signal sequence in several periods associated respectively with a polyphase of the period of the undisturbed periodic transmitted-signal sequence; and
a downstream unit for determining a mean power of the estimated-signal sequence for the undisturbed periodic transmitted-signal sequence and a unit for determining the estimated value of the mean power of the noise-signal sequence which follows the unit for determining a mean power of the received-signal sequence and the unit for determining a mean power of the estimated-signal sequence for the undisturbed periodic transmitted-signal sequence.

10. The device according to claim 9,
wherein a unit for determining a phase offset of the undisturbed periodic transmitted-signal sequence is disposed upstream of the estimator for estimating an estimated-signal sequence for the undisturbed periodic transmitted-signal sequence.

11. A data carrier with a computer program with program-code means for the implementation of the following steps when the program is executed on a computer or a digital signal processor:
determination of a mean power of a received-signal sequence which corresponds to the undisturbed periodic transmitted-signal sequence with the addition of the superposed noise-signal sequence;
estimation of an estimated-signal sequence for the undisturbed periodic transmitted-signal sequence from the received-signal sequence, wherein:
the estimated-signal sequence for the undisturbed periodic transmitted-signal sequence is formed from summated sampled values of the received-signal sequence, and
each summated sampled value of the received-signal sequence is obtained in each case from a sum of sampled values of the received-signal sequence in several periods associated respectively with a polyphase of the period of the undisturbed periodic transmitted-signal sequence;
determination of a mean power of the estimated-signal sequence for the undisturbed periodic transmitted-signal sequence; and
determination of the estimated value of the mean power of the noise-signal sequence from a difference between the determined mean power of the received-signal sequence and the determined mean power of the estimated-signal sequence.

* * * * *